(12) United States Patent
Paczkowski

(10) Patent No.: US 9,860,509 B2
(45) Date of Patent: Jan. 2, 2018

(54) METHOD AND A SYSTEM FOR DETERMINING A VIDEO FRAME TYPE

(71) Applicant: ADVANCED DIGITAL BROADCAST S.A., Chambesy (CH)

(72) Inventor: Jacek Paczkowski, Siemianowice Śląskie (PL)

(73) Assignee: ADVANCED DIGITAL BROADCAST S.A., Chambesy (CH)

( * ) Notice: Subject to any disclaimer, the term of this patent is extended or adjusted under 35 U.S.C. 154(b) by 280 days.

(21) Appl. No.: 14/753,007

(22) Filed: Jun. 29, 2015

(65) Prior Publication Data

US 2016/0007003 A1 Jan. 7, 2016

(30) Foreign Application Priority Data

Jul. 1, 2014 (EP) ..................................... 14175233

(51) Int. Cl.
| | |
|---|---|
| H04N 15/00 | (2006.01) |
| H04N 7/12 | (2006.01) |
| H04N 7/173 | (2011.01) |
| G06T 15/10 | (2011.01) |
| G06T 15/20 | (2011.01) |
| H04N 13/00 | (2006.01) |
| G06K 9/46 | (2006.01) |
| G06T 7/90 | (2017.01) |

(52) U.S. Cl.
CPC ....... *H04N 13/0007* (2013.01); *G06K 9/4642* (2013.01); *G06K 9/4652* (2013.01); *G06T 7/90* (2017.01); *H04N 13/0037* (2013.01); *H04N 13/0048* (2013.01); *G06T 15/20* (2013.01); *H04N 13/0029* (2013.01); *H04N 2013/0077* (2013.01); *H04N 2213/007* (2013.01)

(58) Field of Classification Search
CPC ...... H04N 13/0055; G06T 19/00; G06T 19/20
USPC ......... 348/43; 345/427; 375/240.01; 725/114
See application file for complete search history.

(56) References Cited

U.S. PATENT DOCUMENTS

| | | | | |
|---|---|---|---|---|
| 2009/0300698 | A1* | 12/2009 | Quigley | H04N 21/4126 725/114 |
| 2010/0321390 | A1* | 12/2010 | Kim | H04N 13/0029 345/427 |
| 2013/0044192 | A1* | 2/2013 | Mukherjee | H04N 13/0029 348/51 |
| 2013/0083838 | A1* | 4/2013 | Touze | H04N 5/2355 375/240.01 |

\* cited by examiner

*Primary Examiner* — Thai Tran
*Assistant Examiner* — Syed Hasan
(74) *Attorney, Agent, or Firm* — Mark M. Friedman

(57) ABSTRACT

A computer-implemented method for determining whether a video frame is of a 3D TB type (Top-Bottom) or a 3D LR type (Left-Right) frame, characterized in that it comprises the steps of: receiving a video frame (100); extracting at least three portions (121-124) of the frame, each portion belonging to a distinct quarter of the frame (100, 120) and being positioned at the same fragment of the quarter; calculating color histograms for each portion (121-124); comparing the color histograms of at least two different pairs of portions; generating a frame type indicator based on the result of comparison of the color histograms.

12 Claims, 10 Drawing Sheets

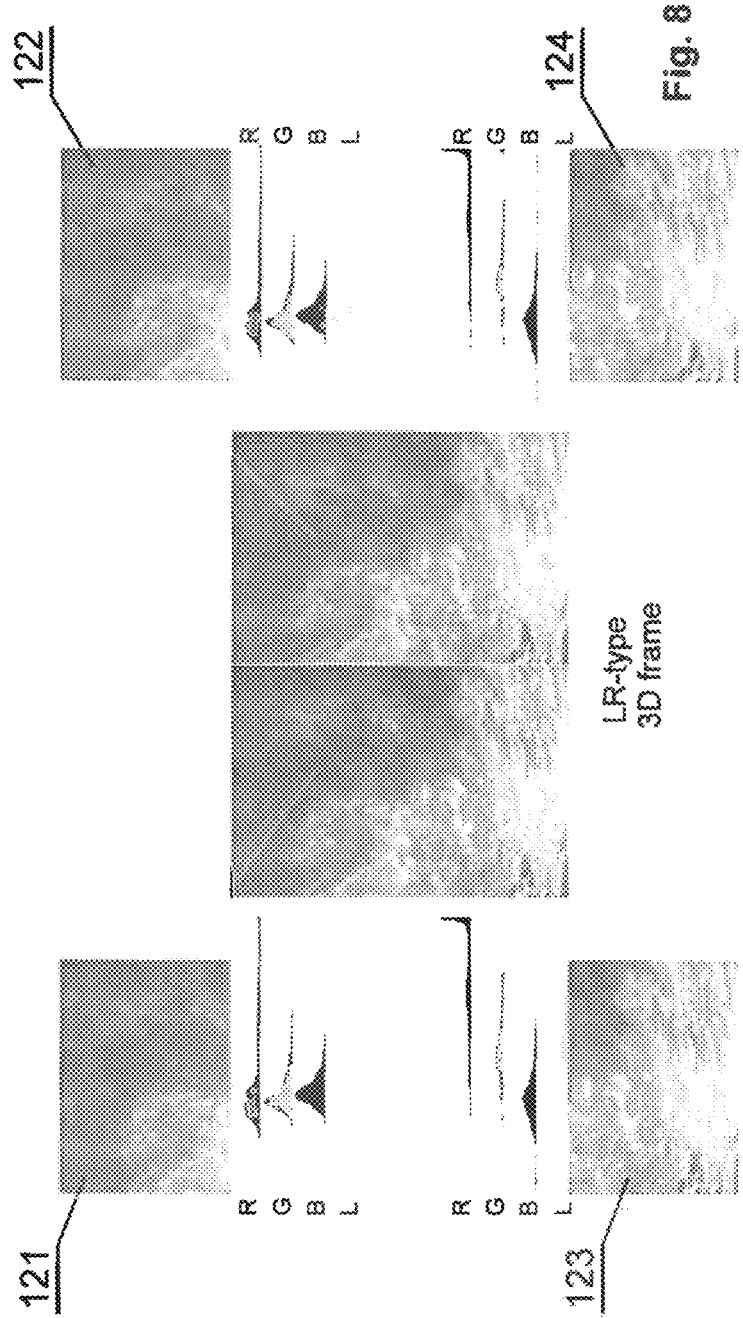

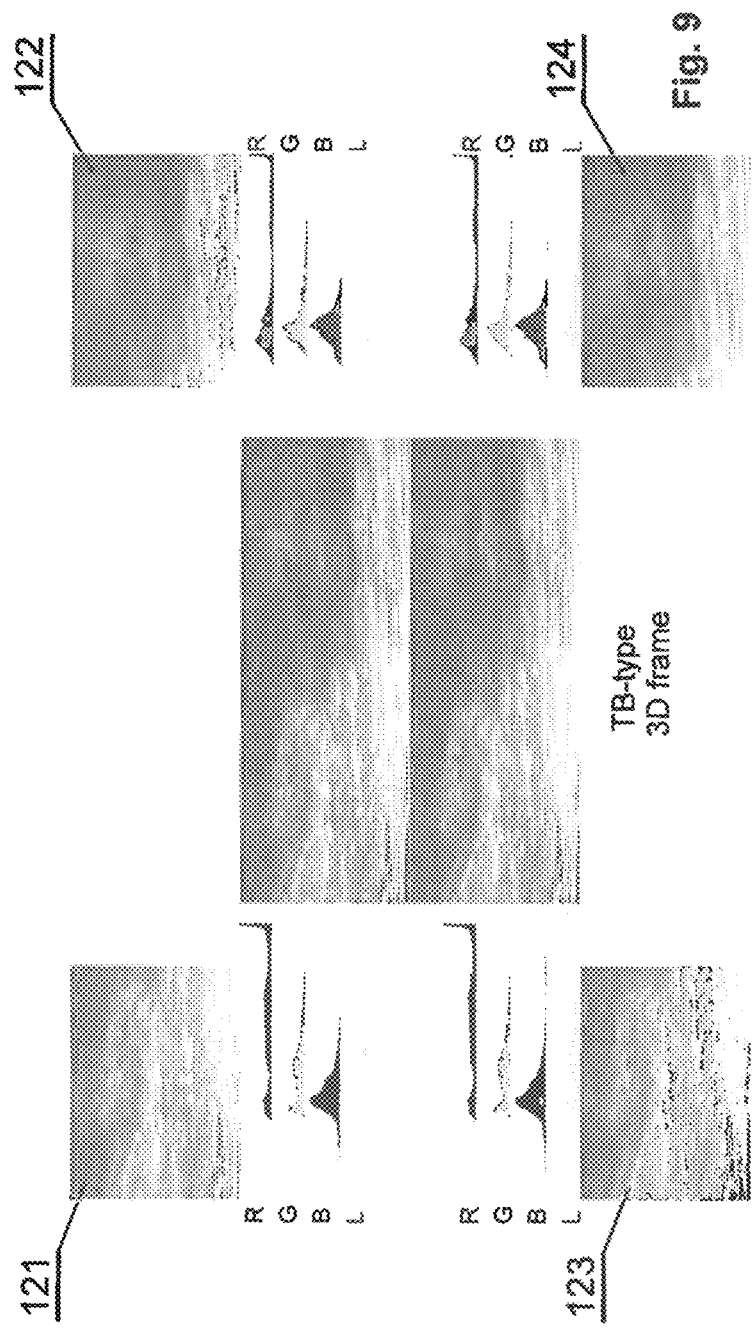

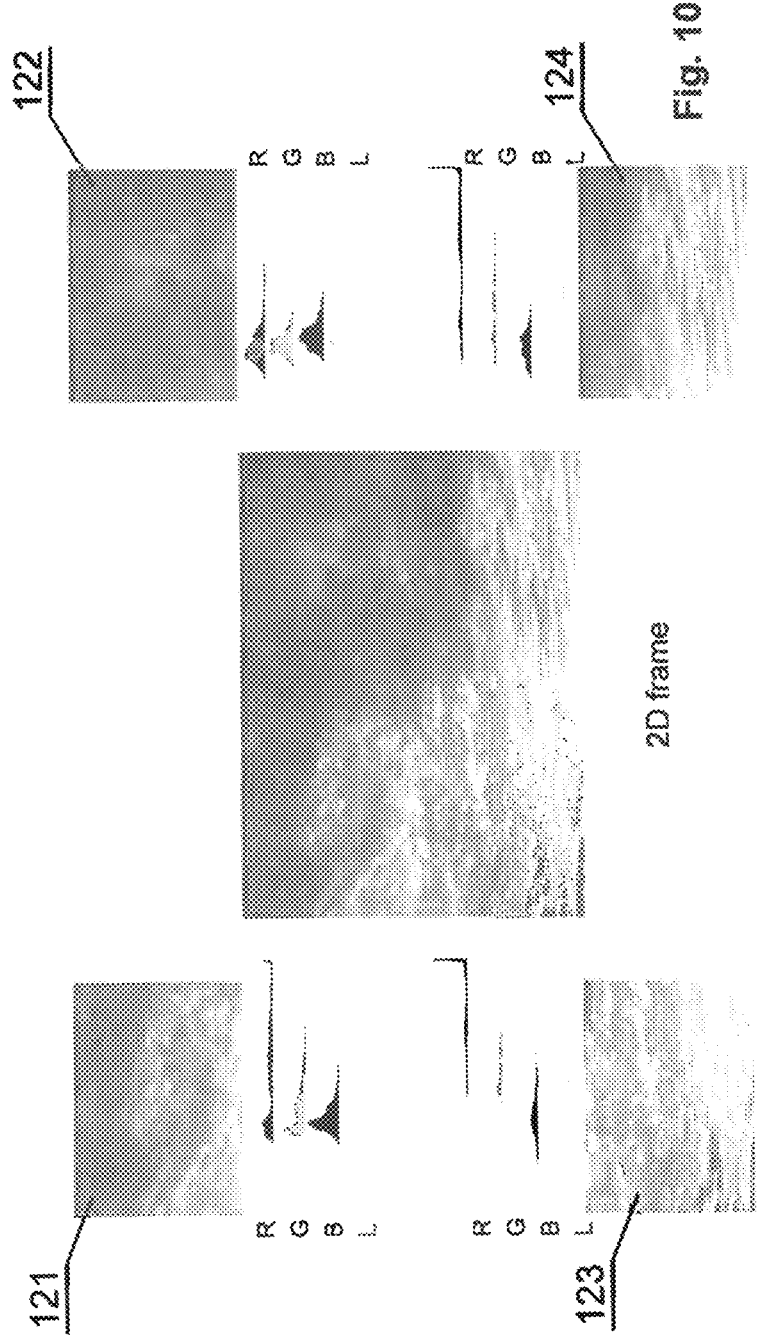

METHOD AND A SYSTEM FOR DETERMINING A VIDEO FRAME TYPE

The present invention relates to determining video frame type, in particular distinguishing between a two-dimensional (2D) and three-dimensional (3D) video frames.

Stereoscopic video displays can be used to display both 2D and 3D video signals, by processing the frames of the signals depending on the type of signal. The type of the signal can be specified manually by the user, which can be troublesome for inexperienced users. The type of signal can be also specified by supplementary data included in the signal itself or by a supplementary signal, which requires the video display unit to be able to decode and recognize the supplementary data or the supplementary signal.

A US patent application US2009/0009508 presents an apparatus and a method for driving a 2D/3D switchable display, which includes an image mode determination unit determining whether input image signals of continuous frames are in a 2D mode or 3D mode. The 3D mode is recognized by determining a syntax indicating a stereo or a multiview image included in the header information of the input image signal. Alternatively, the image mode can be determined based on the presence of a stereo sync signal. Therefore, the mode determination requires data or signals supplementary to the basic image data.

A PCT patent application WO2010/014973 presents a method and an apparatus for encoding or tagging a video frame which provide a way to indicate, to a receiver, whether the video content is 3-D content or 2-D content, by replacing lines of at least one video frame in a 3-D content with a specific color or pattern. Therefore, the method is useful only for receivers, which are able to recognize the specific color or patterns as an indication of a 3-D content.

In case the display lacks the functionality of decoding supplementary data included in the signal or is not able to decode supplementary signals describing the video type, or the video signal contains only basic image contents without the image type indicated, the signal must be recognized in an alternative way.

A European patent application EP10175505 presents a computer-implemented method for determining a video frame type, comprising the steps of receiving a video frame, analyzing the video frame in at least one detector module using at least one algorithm configured to output a type coefficient (p) indicative of a probability that the frame is of a 2D or 3D type, wherein each of the detector modules utilizes at least one algorithm different than the algorithms utilized by the other detector modules, and generating a predicted frame type indicator based on the type coefficients.

The aim of the present invention is to provide an alternative method for determining the video frame type by analyzing video signals having no or unknown indication of video frame type.

There is presented a computer-implemented method for determining whether a video frame is of a 3D TB-type (Top-Bottom) or a 3D LR-type (Left-Right) frame, comprising the steps of: receiving a video frame; extracting at least three portions of the frame, each portion belonging to a distinct quarter of the frame and being positioned at the same fragment of the quarter; calculating color histograms for each portion; comparing the color histograms of at least two different pairs of portions; generating a frame type indicator based on the result of comparison of the color histograms.

Preferably, the method further comprises the step of generating a compacted frame by discarding the non-active regions of the received video frame and providing the compacted frame for analyzing.

Preferably, the method further comprises the step of generating a compacted frame by scaling-down the video frame and providing the compacted frame for analyzing.

Preferably, the method further comprises the step of generating a compacted frame by discarding color information of the video frame and providing the compacted frame for analyzing.

Preferably, the portion of the quarter of the frame is smaller than the quarter of the frame.

Preferably, the at least three portions of the frame comprise a portion of the top-left quarter of the frame, a portion of the top-right quarter of the frame and a portion of the bottom-left quarter of the frame.

Preferably, the color histogram of the portion of the top-left quarter of the frame is compared with the color histogram of the portion of the top-right quarter of the frame; and wherein the color histogram of the portion of the top-left quarter of the frame is compared with the color histogram of the portion of the bottom-left quarter of the frame.

Preferably, the at least three portions of the frame comprise a portion of the top-left quarter of the frame, a portion of the top-right quarter of the frame and a portion of the bottom-left quarter of the frame and a portion of the bottom-right quarter of the frame.

Preferably, if TL&TR<TL&BL and BL&BR<TR&BR, the frame is determined as an LR type frame and/or if TL&TR>TL&BL and BL&BR>TR&BR, the frame is determined as a TB type frame. In such case, TL is the color histogram of the top left portion, TR is the color histogram of the top right portion, BL is the color histogram of the bottom left portion, BR is the color histogram of the bottom right portion, wherein the & operator relates to a formula:

$$H1 \ \& \ H2 = \sum_{i=1}^{n} (H1i - H2i)^2$$

wherein:
  H1, H2 are histograms of a pair;
  i denotes the value of the i-th coefficient of the histogram;
  n denotes the total number of coefficients in the histogram.

Preferably, the video frame is received upon a change of an input video signal.

Preferably, the video frame is received with a predetermined frequency.

There is also disclosed a computer program comprising program code means for performing all the steps of the computer-implemented method as described above when said program is run on a computer, as well as a computer readable medium storing computer-executable instructions performing all the steps of the computer-implemented method as described above.

There is also disclosed a system for determining a video frame type, the system comprising: at least three extractors, each configured to extract a portion of the frame, each portion belonging to a distinct quarter of the frame and being positioned at the same fragment of the quarter; color histogram generators, each configured to calculate a color histogram for each extracted portion; an LR-type frame detector and a TB-type frame detector each configured to compare the color histograms of at least two different pairs of portions and to generate a frame type indicator based on the result of comparison of the color histograms.

The present invention will be shown by means of an exemplary embodiment on a drawing, in which:

FIG. 8 shows examples of color histograms for a 3D video frame of the Left-Right (LR) type.

FIG. 9 shows examples of color histograms for a 3D video frame of the Top-Bottom (TB) type.

FIG. 10 shows examples of color histograms for a 2D video frame.

Figure 1A:
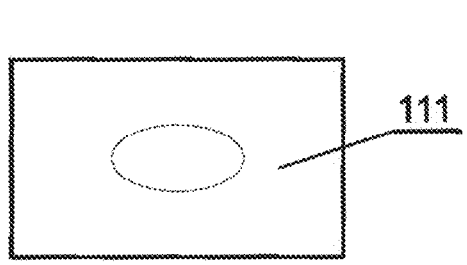
FIGS. 1A-1D show examples of typical 2D video frames.
Figure 1B:
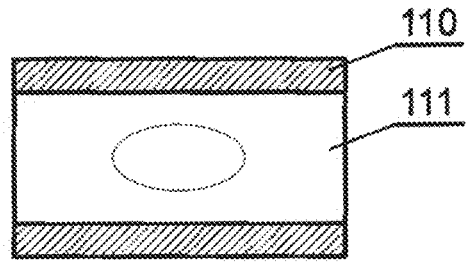
Figure 1C:
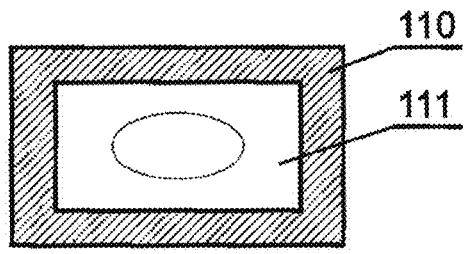
Figure 1D:
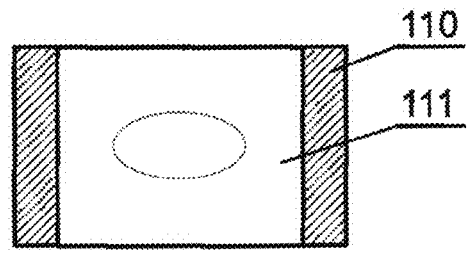

FIG. 1A-1D show examples of typical 2D video frames. The frame may comprise only an active image region 111 as shown in FIG. 1A. Alternatively, the 2D frame may further comprise a non-active image region 110, such as bars of a uniform color, e.g. black, at the top and bottom edges of the frame as shown in FIG. 1B or bars at the top, bottom, left and right edges of the frame as shown in FIG. 1C or bars at the left and right edges of the frame as shown in FIG. 1D.

Figure 2A:
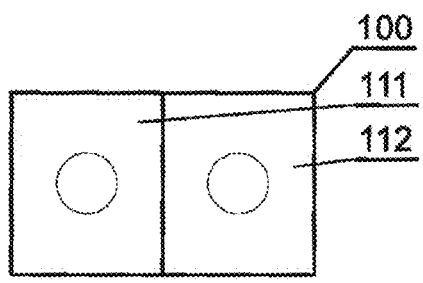
FIGS. 2A-2H show examples of typical 3D video frames of an Left-Right (LR) type.
Figure 2B:
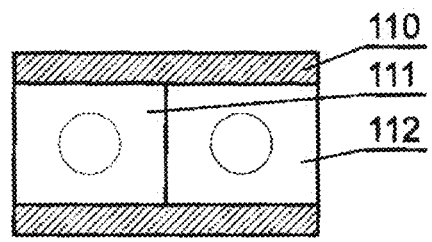
Figure 2C:
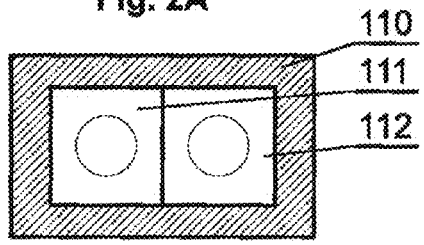
Figure 2D:
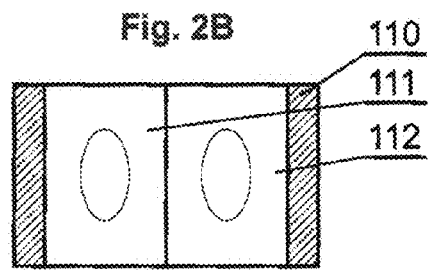
Figure 2E:
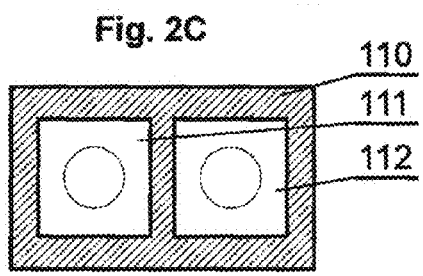
Figure 2F:
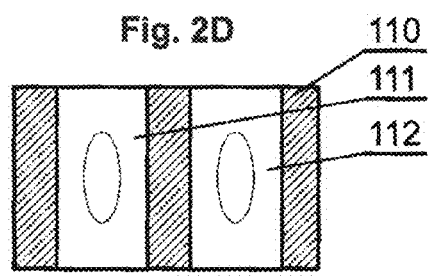
Figure 2G:
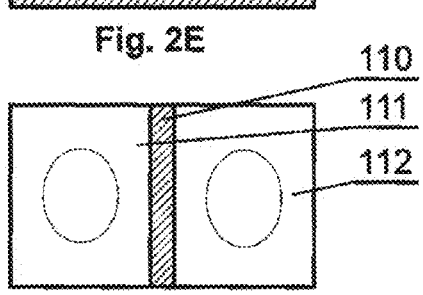
Figure 2H:
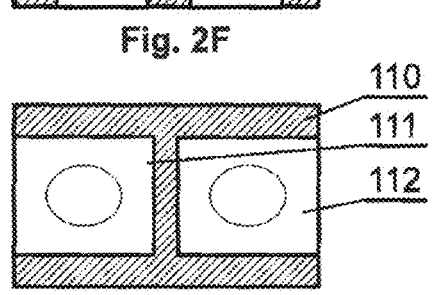

FIGS. 2A-2H show examples of typical 3D video frames 100 of a Left-Right (LR) type. Such frame, as shown in FIG. 2A, comprises two active image regions 111, 112, which define the content to be displayed for the left and right eye. The active regions 111, 112 may be scaled-down in the horizontal direction in order to fit into dimensions of a standardized 2D frame. A 3D frame may also contain non-active image regions 110, such as bars of a uniform color, e.g. black, at the top and bottom edges of the frame as shown in FIG. 2B, at the top, bottom, left and right edges of the frame as shown in FIG. 2C, at the left and right edges of the frame as shown in FIG. 2D, at the top, bottom, left and right edges of the frame and between the active regions as shown in FIG. 2E, at the left and right edges of the frame and between the active regions as shown in FIG. 2F, between the active regions as shown in FIG. 2G or at the top and bottom edges of the frame and between the active regions as shown in FIG. 2H.

Figure 3A:
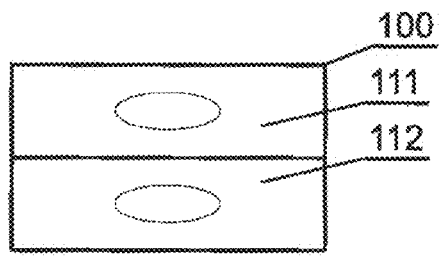
FIGS. 3A-3H show examples of typical 3D video frames of a Top-Bottom (TB) type.
Figure 3B:
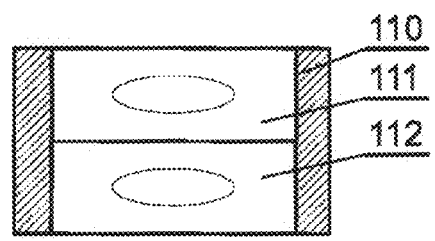
Figure 3C:
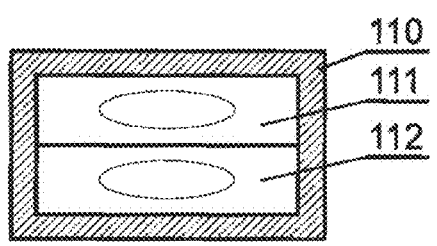
Figure 3D:
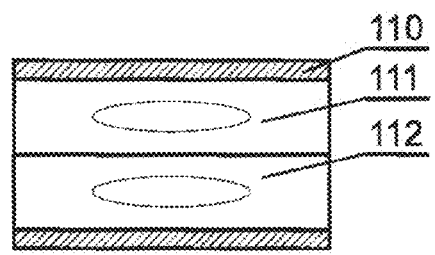
Figure 3E:
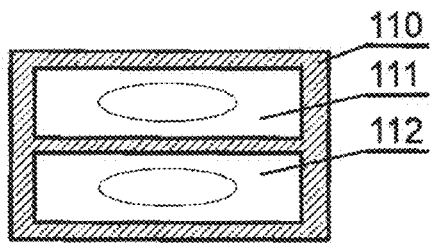
Figure 3F:
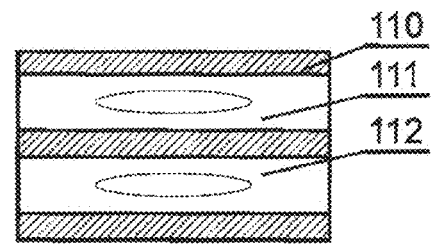
Figure 3G:
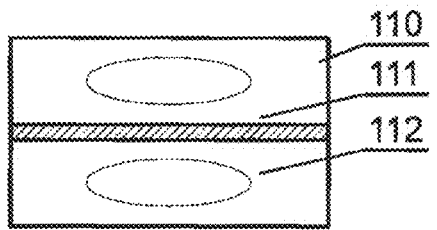
Figure 3H:
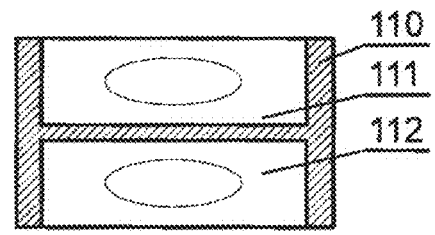

FIGS. 3A-3H show examples of typical 3D video frames 100 of a Top-Bottom (TB) type. Such frame, as shown in FIG. 3A, comprises two active image regions 111, 112, which define the content to be displayed for the left (e.g. the top region) and the right (e.g. the bottom region) eye. The active regions 111, 112 may be scaled-down in the vertical direction in order to fit into dimensions of a standard 2D frame. A 3D frame may also contain non-active image regions 110, such as: bars of a uniform color, e.g. black, at the left and right edges of the frame as shown in FIG. 3B, at the top, bottom, left and right edges of the frame as shown in FIG. 3C, at the top and bottom edges of the frame as shown in FIG. 3D, at the top, bottom, left and right edges of the frame and between the active regions as shown in FIG. 3E, at the top and bottom edges of the frame and between the active regions as shown in FIG. 3F, between the active regions as shown in FIG. 3G or at the left and right edges of the frame and between the active regions as shown in FIG. 3H.

Figure 4A:
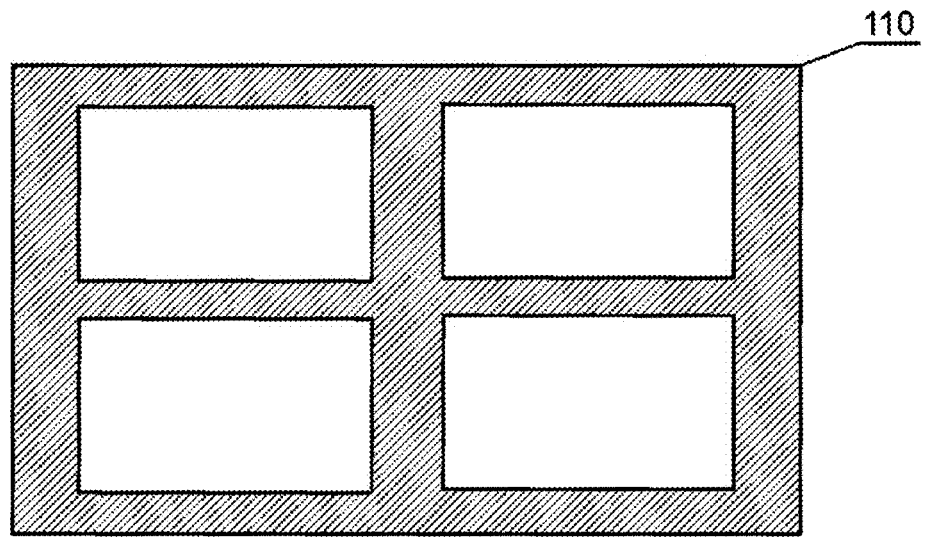
FIG. 4A shows common most probable non-active image regions of a video frame and FIG. 4B shows a compacted frame with the most probable non-active image regions removed.
Figure 4B:
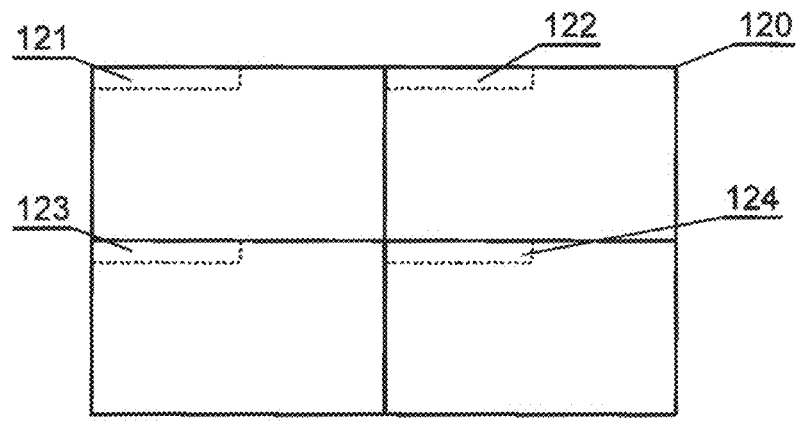

Therefore, for any 2D or 3D video frame, the most probable non-active regions 110 may form bars at the top, bottom, left, right, horizontal centre and vertical centre of the frame, as shown in FIG. 4A. FIG. 4B shows a compacted frame 120 with the most probable non-active image regions removed.

Figure 5:
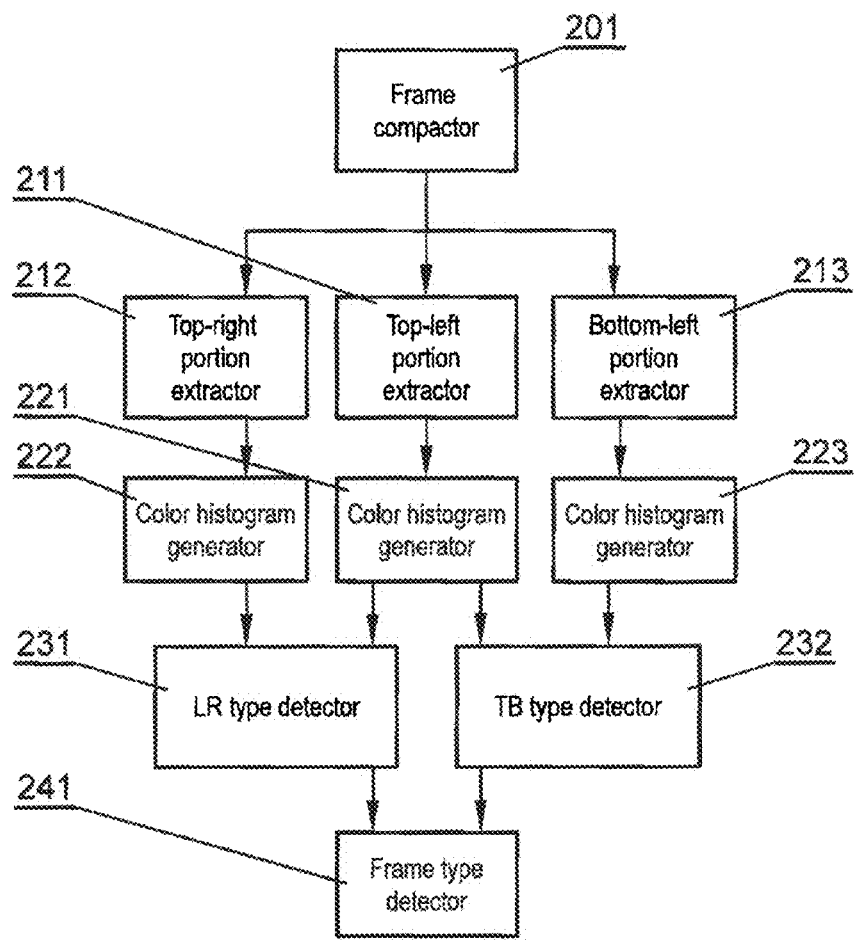
FIG. 5 shows the structure of a first embodiment of a system for determining video frame type.

FIG. 5 shows the structure of a first embodiment of a system for determining video frame type according to the invention. The system comprises a frame compactor 201 configured to extract from the input video frames data representing an active region and discard the data representing the most probable non-active regions of the frame to obtain the compacted frame 120, according to the procedure shown in FIG. 6, and possibly to reduce the amount of data by scaling-down the frame. Module 201 is optional, it can be disregarded e.g. when it is known that the received frame does not contain non-active regions. The compacted frame representation is passed to three extractors 211-213, which extract a portion of the compacted frame. The top-left extractor 211 extracts a portion 121 of the top-left quarter of the frame. The top-right extractor 212 extract a portion 122 of the top-right quarter of the frame, wherein the portion 122 has the same position within the top-right quarter of the frame as the portion 121 of the top-left quarter. The bottom-left extractor 213 extract a portion 123 of the bottom-left quarter of the frame, wherein the portion 123 has the same position within the bottom-left quarter of the frame as the portion 121 of the top-left quarter.

The extracted frame portions 121, 122, 123 may be rectangular regions adjacent to one or more edges of the quarter of the frame, or may be non-adjacent to the frame edges. The width may be equal to the width of the quarter of the frame or shorter. The height may be equal to the height of the quarter or shorter. In one embodiment, the portion may have a form of a strip adjacent to the top and left edges of the quarter, a length equal to half of the length of the quarter and a height equal to $\frac{1}{8}^{th}$ of the height of the quarter, as shown in FIG. 4B. However, other shapes of frame portions The extracted frame portions 121-123 are input to color histogram generators 221-223, which generate histograms of colors for each portion 121-123, as shown in the examples of FIG. 8-10. Prior to generating the histograms, the color space of the portion content may be reduced, e.g. by reducing number of colors in each color component to 128, 64, 32, 16, or 8 colors. The color space may be also reduced e.g. by reducing the color space, e.g. by converting the image to a grayscale.

Next, the color histograms generated by modules 221-223 are compared in detectors 231, 232, which compare the histograms using e.g. the least squares method. The LR frame type detector 231 is configured to compare the histogram of the top-left portion 121 and bottom-left portion 122. In case the comparison result is lower than a threshold (as may be deducted from FIG. 8), the frame is determined by the frame type detector 241 as LR-type frame. The TB frame type detector 232 is configured to compare the histogram of the top-left portion 121 and top-right portion 123. In case the comparison result is lower than a threshold (as may be deducted from FIG. 9), the frame is determined by the frame type detector 241 as TB-type frame. Otherwise, if both results are higher than the threshold (as may be deducted from FIG. 10), the frame is determined as a mono frame. In case both results are lower than the threshold, the frame type can be selected by the frame type detector 241 as the one corresponding to the lower results or the frame can be classified as undefined type and the system may be configured to delay detection of type until a next frame is analyzed.

Figure 6:
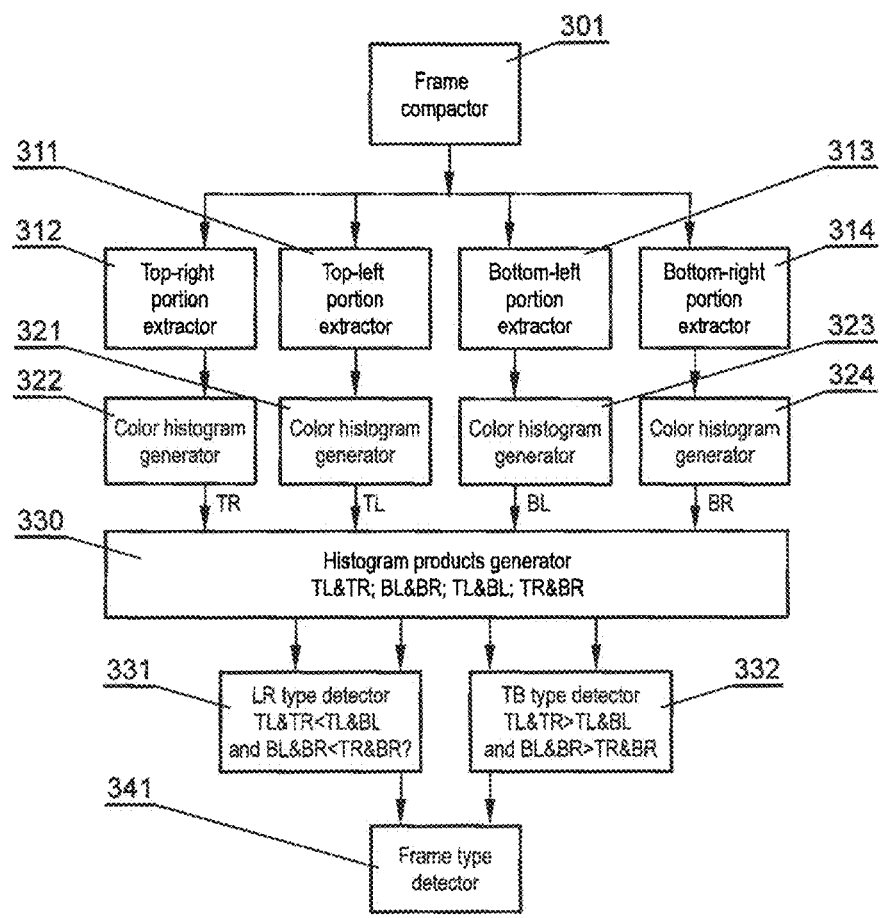
FIG. 6 shows the structure of a second embodiment of a system for determining video frame type.

FIG. 6 shows the structure of a second embodiment of a system for determining video frame type according to the invention. The system comprises a frame compactor 301 equivalent to the frame compactor 201 of FIG. 5. The compacted frame representation is passed to four extractors 311-314, which extract a portion of the compacted frame. The extractors 311-313 are equivalent to the extractors 211-213 of FIG. 5. The bottom-right extractor 314 extracts a portion 124 of the bottom-right quarter of the frame, wherein the portion 124 has the same position within the bottom-right quarter of the frame as the portion 124 of the top-left quarter.

The extracted frame portions 121-124 are input to color histogram generators 321-324, which generate histograms of colors for each portion 121-124, as seen on FIGS. 8-10. Prior to generating the histograms, the color space of the portion content may be reduced, e.g. by reducing number of colors to 128, 64, 32, 16, or 8 colors.

Next, the color histograms generated by modules 321-324 are multiplied in a histogram pair values comparator 330 which calculates the sum of squares of differences in the number of pixels related to particular histogram coefficient, using the formula:

$$H1 \& H2 = \sum_{i=1}^{n} (H1i - H2i)^2$$

wherein:
H1, H2 are histograms of a pair
i denotes the value of the i-th coefficient of the histogram
n denotes the total number of coefficients in the histogram
Next, the histogram pair values are compared.

In the LR type detector 331, it is checked whether the pair values meet the criteria: TL&TR<TL&BL and BL&BR<TR&BR. If so (as may be deducted from FIG. 8), the frame is determined as an LR type frame.

In the TB type detector 332, it is checked whether the pair values meet the criteria: TL&TR>TL&BL and BL&BR>TR&BR. If so (as may be deducted from FIG. 9), the frame is determined as a TB type frame.

Otherwise, the frame type is determined to be undefined or mono frame or undefined type.

Figure 7:
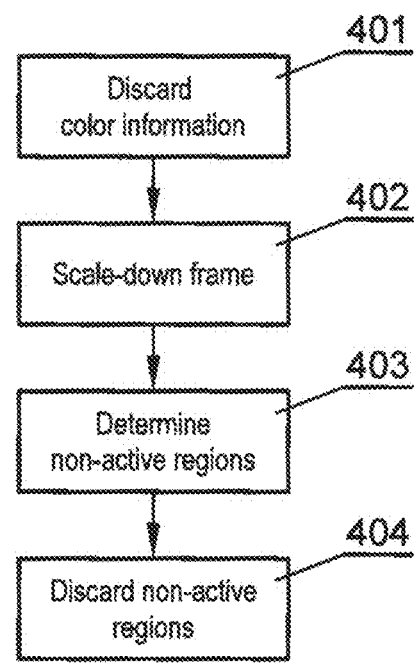
FIG. 7 shows the procedure of operation of a frame compactor.

FIG. 7 shows the procedure of operation of the frame compactor 201. In step 401, the received input frame may be reduced for easier analysis, by scaling it down, i.e. reducing the size of the frame. Next, in step 402 the color information can be discarded, either by converting the frame contents into a grayscale or selecting contents of only one color channel. Next, in step 403 the frame is analyzed to detect the non-active regions, preferably in areas indicated in FIG. 4, namely in the bars located at the top, bottom, left, right, horizontal centre and vertical centre of the frame. The contents of the detected non-active regions are discarded in step 404 so as to generate a frame containing only data of active regions, as shown in FIG. 1A, 2A or 3A. The processing of a frame by the frame compactor 201 may be initiated after a change of the video input signal, for example a change of a channel in a television decoder, in order to determine the type of the new signal. Alternatively, the frame compactor 201 may be operated continuously, in order to detect change of type of the received signal, for example to detect a 2D commercial break in a 3D video film. In such a case, the frame compactor 201 may receive the frames with a specific frequency, preferably lower than the frame display rate, such as 2 frames per second, in order to minimize the computational load of the signal receiver.

FIGS. 8-10 show examples of color histograms for a 3D video frame of the Left-Right (LR) type, for a 3D video frame of the Top-Bottom (TB) type and for a 2D video frame, respectively. The histograms represent the values of color components: Red, Green, Blue and the value of Luminance.

In case the system according to the invention is embedded in a video display unit, the determined frame type can be used to select the method of processing the signal to be displayed. In case the system according to the invention is embedded in a video decoder, such as a television set-top box, the determined frame type can be used to select the method of processing the signal to be passed to a display unit, for example converting a 2D signal to a 3D format in case the display unit is set to receive 3D video signals.

It can be easily recognized, by one skilled in the art, that the aforementioned system and method for determining video frame type may be performed and/or controlled by one or more computer programs. Such computer programs are typically executed by utilizing the computing resources of a processing unit which can be embedded within various video signal receivers, such as personal computers, personal digital assistants, cellular telephones, receivers and decoders of digital television, video display units or the like. The computer programs can be stored in a non-volatile memory, for example a flash memory or in a volatile memory, for example RAM and are executed by the processing unit. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein. Accordingly, the scope of protection is not limited to the preferred embodiments described in the specification, but is only limited by the claims that follow.

The invention claimed is:

1. A computer-implemented method for determining whether a video frame is of a 3D TB type (Top-Bottom) or a 3D LR type (Left-Right) frame, characterized in that it comprises the steps of:
   receiving a video frame;
   extracting at least three portions of the frame, each portion belonging to a distinct quarter of the frame and being positioned at the same fragment of the quarter;
   calculating color histograms for each portion;
   comparing the color histograms of at least two different pairs of portions; and
   generating a frame type indicator based on the result of comparison of the color histograms, wherein the at least three portions of the frame comprise
a portion of the top-left quarter of the frame,
a portion of the top-right quarter of the frame,
a portion of the bottom-left quarter of the frame, and
a portion of the bottom-right quarter of the frame,
wherein if TL&TR<TL&BL and BL&BR<TR&BR, the frame is determined as an LR type frame, wherein
TL is the color histogram of the top left portion,
TR is the color histogram of the top right portion,
BL is the color histogram of the bottom left portion,
BR is the color histogram of the bottom right portion, and
wherein the & operator relates to a formula:

$$H1 \& H2 = \sum_{i=1}^{n}(H1i - H2i)^2$$

wherein:
H1, H2 are histograms of a pair;
i denotes the value of the i-th coefficient of the histogram; and
n denotes the total number of coefficients in the histogram.

2. The method according to claim 1, further comprising the step of generating a compacted frame by discarding the non-active regions of the received video frame and providing the compacted frame for analyzing.

3. The method according to claim 1, further comprising the step of generating a compacted frame by scaling-down the video frame and providing the compacted frame for analyzing.

4. The method according claim 1, further comprising the step of generating a compacted frame by discarding color information of the video frame and providing the compacted frame for analyzing.

5. The method according to claim 1, wherein the portion of the quarter of the frame is smaller than the quarter of the frame.

6. The method according to claim 1, wherein the at least three portions of the frame comprise a portion of the top-left quarter of the frame, a portion of the top-right quarter of the frame and a portion of the bottom-left quarter of the frame.

7. The method according to claim 6,
wherein the color histogram of the portion of the top-left quarter of the frame is compared with the color histogram of the portion of the top-right quarter of the frame; and
wherein the color histogram of the portion of the top-left quarter of the frame is compared with the color histogram of the portion f of the bottom-left quarter of the frame.

8. The method according to claim 1, wherein the video frame is received upon a change of an input video signal.

9. The method according to claim 1, wherein the video frame is received with a predetermined frequency.

10. A non-transitory computer readable medium storing computer-executable instructions performing all the steps of the computer-implemented method according to claim 1 when executed on a computer.

11. A system for determining a video frame type, characterized in that it comprises:

at least three extractors,
each configured to extract a portion of the frame,
each portion belonging to a distinct quarter of the frame and being positioned at the same fragment of the quarter;
color histogram generators,
each configured to calculate a color histogram for each extracted portion; and
an LR-type frame detector and a TB-type frame detector
each configured to compare the color histograms of at least two different pairs of portions and
to generate a predicted frame type indicator based on the result of comparison of the color histograms,
wherein the at least three portions of the frame comprise
a portion of the top-left quarter of the frame,
a portion of the top-right quarter of the frame,
a portion of the bottom-left quarter of the frame, and
a portion of the bottom-right quarter of the frame,
wherein if TL&TR<TL&BL and BL&BR<TR&BR, the frame is determined as an LR type frame, wherein
TL is the color histogram of the top left portion,
TR is the color histogram of the top right portion,
BL is the color histogram of the bottom left portion,
BR is the color histogram of the bottom right portion, and
wherein the & operator relates to a formula:

$$H1 \& H2 = \sum_{i=1}^{n}(H1i - H2i)^2$$

wherein:
H1, H2 are histograms of a pair;
i denotes the value of the i-th coefficient of the histogram; and
n denotes the total number of coefficients in the histogram.

12. A computer-implemented method for determining whether a video frame is of a 3D TB type (Top-Bottom) or a 3D LR type (Left-Right) frame, characterized in that it comprises the steps of:
receiving a video frame;
extracting at least three portions of the frame, each portion belonging to a distinct quarter of the frame and being positioned at the same fragment of the quarter;
calculating color histograms for each portion;
comparing the color histograms of at least two different pairs of portions; and
generating a frame type indicator based on the result of comparison of the color histograms,
wherein the at least three portions of the frame comprise
a portion of the top-left quarter of the frame,
a portion of the top-right quarter of the frame,
a portion of the bottom-left quarter of the frame, and
a portion of the bottom-right quarter of the frame,
wherein if TL&TR>TL&BL and BL&BR>TR&BR, the frame is determined as a TB type frame, wherein
TL is the color histogram of the top left portion,
TR is the color histogram of the top right portion,
BL is the color histogram of the bottom left portion,
BR is the color histogram of the bottom right portion, and
wherein the & operator relates to a formula:

$$H1 \& H2 = \sum_{i=1}^{n}(H1i - H2i)^2$$

wherein:
H1, H2 are histograms of a pair;
i denotes the value of the i-th coefficient of the histogram; and
n denotes the total number of coefficients in the histogram.

\* \* \* \* \*